United States Patent [19]

Goldner et al.

[11] Patent Number: 4,832,463

[45] Date of Patent: May 23, 1989

[54] THIN FILM ION CONDUCTING COATING

[75] Inventors: Ronald B. Goldner, Lexington; Terry Haas, Sudbury; Kwok-Keung Wong, Watertown; George Seward, Arlington, all of Mass.

[73] Assignee: Tufts University, Medford, Mass.

[21] Appl. No.: 93,782

[22] Filed: Sep. 8, 1987

[51] Int. Cl.$^4$ .......................... G02F 1/01; G02F 1/17
[52] U.S. Cl. ..................................................... 350/357
[58] Field of Search ...................... 350/357, 355, 353

[56] References Cited

U.S. PATENT DOCUMENTS

| | | |
|---|---|---|
| 3,888,565 | 6/1975 | Haacke et al. ................... 350/357 X |
| 4,256,379 | 3/1981 | Green .................................. 350/357 |
| 4,325,611 | 4/1982 | Huggins et al. ..................... 350/357 |
| 4,367,267 | 1/1983 | Oi ...................................... 350/357 X |
| 4,433,901 | 2/1984 | Takahashi et al. ................. 350/357 |
| 4,482,216 | 11/1984 | Hashimoto .......................... 350/357 |
| 4,728,177 | 3/1988 | Green .................................. 350/357 |

FOREIGN PATENT DOCUMENTS 1239228 10/1986 Japan .................................. 350/357

OTHER PUBLICATIONS

Miyauchi et al., "New Amorphous Thin Films of Lithium Ion Conductive Solid Electrolyte", *Solid State Ionics*, 1983, pp. 1469–1472.

Svensson et al., "Electrochromic Coatings for Smart Windows", SPIE, vol. 502, *Optical Materials Technology for Energy Efficient and Solar Energy Conversion*, III, (1984), pp. 30–37.

Primary Examiner—Eugene R. LaRoche
Assistant Examiner—Nathan W. McCutcheon
Attorney, Agent, or Firm—Richard A. Menelly

[57] ABSTRACT

Durable thin film ion conducting coatings are formed on a transparent glass substrate by the controlled deposition of the mixed oxides of lithium:tantalum or lithium:niobium. The coatings provide durable ion transport sources for thin film solid state storage batteries and electrochromic energy conservation devices.

13 Claims, 2 Drawing Sheets

THIN FILM ION CONDUCTING COATING

BACKGROUND OF THE INVENTION

Thin film transparent coatings for modulating optically active materials are currently available for providing "smart" windows whereby the reflective and transmissive properties of the windows can be varied by controlling the transport of electrons and ions into and out of the optically variable layer. U.S. patent application Ser. No. 642,956, filed Aug. 21, 1984 and entitled "Light Modulating Device" describes materials used to form such coatings.

Thin film materials are also known for providing electrical storage batteries having large areas for storing electric energy. The use of specific thin film electro-optically active materials for a solid state battery is described, for example, in a publication entitled "Electrochromic 'Smart' Windows" by Ronald B. Goldner, which appeared in the IEEE Reflector Publication, Vol. 35, May, 1987.

For purposes of this disclosure, a thin film electro-optical device has a thickness in the order of several thousand Angstroms in contrast with so-called "thick film" solid state electronic circuits which are in excess of several microns. The aforementioned U.S. patent application, which is incorporated herein for purposes of reference, teaches a five layer device deposited on glass for controlling the reflective properties of one of the layers to selectively transmit optical energy through a transparent substrate. Although such thin film devices have been known for some time, commercial utilization of such thin film electro-optic devices has not heretofore been made economically feasible.

One of the modulating layers, the ion-conducting layer, that is used to transport ions into the electrochromic layer must exhibit and maintain two electrically opposing properties. The ion-conducting layer must readily transmit ions upon application of an electric field yet remain electrically insulative to electron transport. Such electrically insulative properties are found to vary over wide ranges of climatic conditions. Materials currently used to form the ion-conducting layer in electrochromic devices are slightly hydroscopic as well as water soluble. Increased moisture content in the air surrounding the electrochromic devices, besides causing variations in the insulative properties, can actually dissolve and hence destroy the coating unless the device is placed in a humidity controlled environment. The mechanical properties of such materials have been found to vary with increasing temperature. For temperatures in excess of 100° C., these materials tend to crystallize, crack and thereby lose adherence to their immediate substrate.

For architectural applications as well as for use within the automotive, aircraft and military applications, rigid performance specifications are required with respect to mechanical strength, resistance to humidity and temperature stability. Temperature specifications for most commercial applications require good mechanical strength at temperatures in excess of 200° C., for example.

One purpose of this invention therefore is to describe methods and materials for providing an electrically active layer having good ionic transport properties along with high electronic resistance, while retaining high physical integrity over wide ranges of temperature and humidity.

SUMMARY OF THE INVENTION

A transparent thin film ion-conductive and electronically resistive layer is formed by deposition of mixed oxides of lithium and tantalum or lithium and niobium on electro-optically active substrates for controlling the optical properties thereof. The same materials are used for providing the electrolyte layer in thin film storage batteries.

DESCRIPTION OF THE PREFERRED EMBODIMENT

Figure 1A:
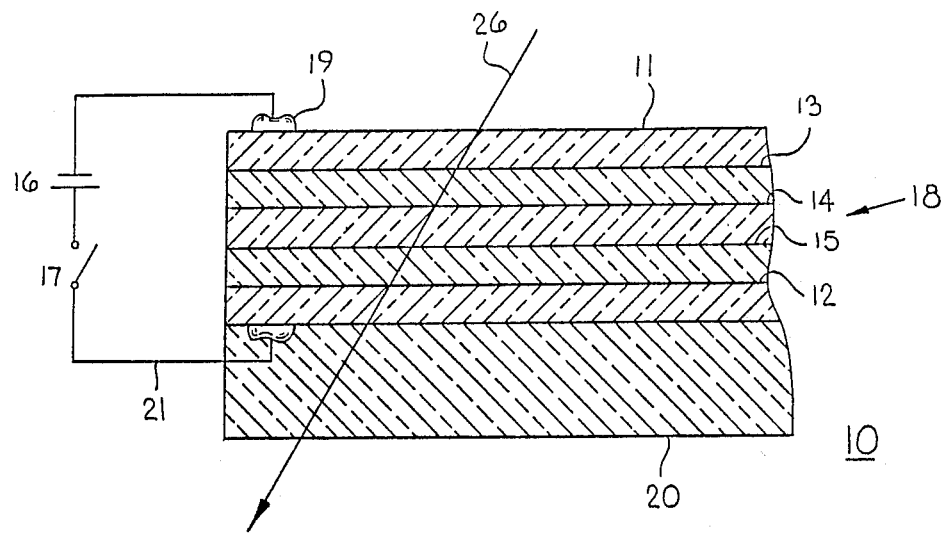
FIGS. 1A and 1B are cross-sectional views of a five layer electro-optic device depicting the electronically controlled optically reflective properties.

A deposited five layer structure 18 on a glass substrate 20 is depicted in FIG. 1A wherein the layered structure 18 includes an ion-conducting layer 14. The layered structure is hereinafter referred to as a "smart window", whereby an electric field provided by means of a low voltage battery 16 and switch 17 is applied to the layered structure by means of indium or other metal electrodes 19 and wire conductors 21. As described in the aforementioned U.S. patent application, the polarity of the battery 16 governs the nature of the electric charge transporting between the first transparent electron conducting layer 11, counter-electrode layer 13, ion-conducting layer 14, electrochromic layer 15, and the second transparent conducting layer 12. When switch 17 in FIG. 1A is closed, the field across the deposited layered structure 18 conducts ions from the electrochromic layer 15 to the counter-electrode layer 13 through the ion-conducting layer 14, resulting in the "bleached" state depicted in FIG. 2 whereby the transmittance through the glass substrate 20 is a maximum. Representative light ray 26 represents wavelengths larger than 0.7 micron, defined as the "near-infrared" region of the optical spectrum. As described within the aforementioned patent application, the infrared region of the solar spectrum is that region whereby most of the usable heat energy from the sun is transmitted.

Figure 1B:
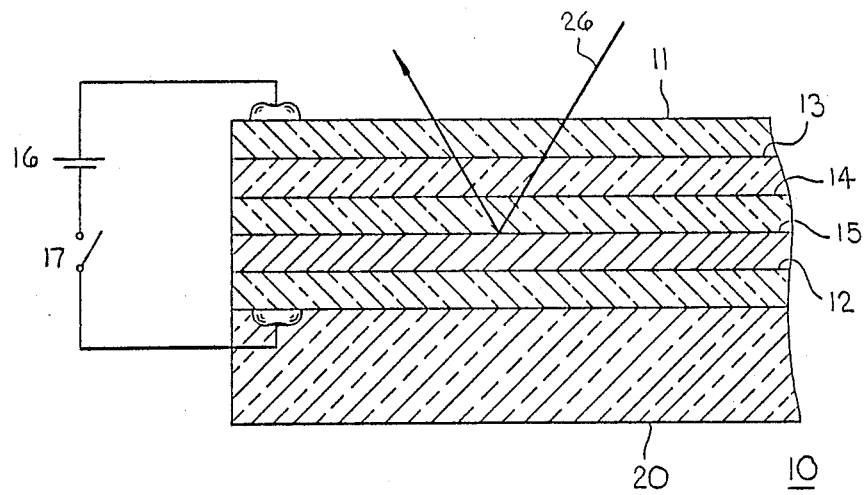
Figure 2:
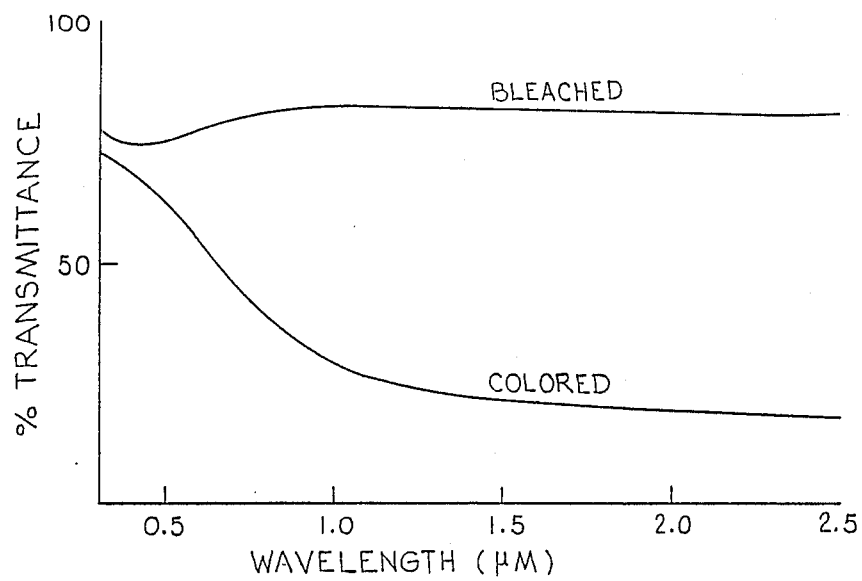
FIG. 2 is a graphic representation of the transmittance through the device depicted in FIGS. 1A and 1B, as a function of incident wavelength.

The layered structure 18 is depicted in FIG. 1B with the polarity of battery 16 reversed with respect to that in FIG. 1A such that when switch 17 is depressed, a field is generated across the layered structure such that ions are transmitted from the counter-electrode layer into the electrochromic layer 15, changing the structure of the electrochromic layer to the metallic or so-called "colored" state depicted in FIG. 2. In this state a large portion of the infrared energy is reflected by the electrochromic layer 15, as indicated by the reflection of the representative light ray 26. The phenomenon of reflection by the polycrystalline tungsten oxide material ($WO_3$) comprising the electrochromic layer 15 is described, for example, in the article entitled "Further Evidence for Free Electrons as Dominating the Behavior of Electrochromic Polycrystaline $WO_3$ Films", which appeared in the Applied Physics Letters, 47 (5) Sept. 1, 1985, which paper is incorporated herein for purposes of reference.

To provide a durable, economically feasible electrochromic device, the following materials were selected for layers 11-15 in the layered structure depicted in the previous Figures. Layers 11 and 12 were formed from RF sputtered tin-doped indium oxide; layer 13 was formed from RF sputtered $In_2O_3$; layer 14 was formed from RF sputtered $LiO_2:Nb_2O_5$; and layer 15 was formed from RF sputtered $WO_3$. Layers 11, 12, 13 and 15 were similar to those described in the aforementioned U.S. patent application. Layer 14, the ion-conducting or electrolyte layer, was formed by RF sputtering $LiNbO_3$ to form a mixed phase oxide having a "glassy" configuration i.e., durable and transparent. Although it was earlier known that such mixed-oxide glasses exhibited high ionic conductivity and high electronic resistivity per se, as described within an article entitled "Ionic Conductivity of Quenched Alkali Niobate and Tantalate Glasses", which appeared in the Journal of Applied Physics 49 (9) September 1978, such use was not heretofore considered as an ion conducting layer within a light modulating layered structure.

One of the difficulties involved in attempting to RF sputter a mixed phase oxide resulting in stoichiometric $Li_2O:Nb_2O_5$ is that, when stoichiometric quantities of $LIO_2$ and $Nb_2O_5$ are prepared for RF sputtering onto the electrochromic layer 15, the resulting mixed phase oxides of lithium and tantalum are less than stoichiometric and hence do not exhibit the optimum ionic conductivity and maximum electronic resistivity, as required within electrochromic layered structures. It has since been observed that when the mixed oxides of lithium and niobium are prepared in excess of stoichiometric quantities, the resulting sputter-deposited mixed oxides become stoichiometric since some material is lost in the sputtering process. When electronic layered structures 18 are formed by means of a continuous RF sputtering process within an inert gas-oxygen atmosphere, durable water resistant layered structures are formed that also exhibit stability at temperatures in excess of 200° C. to 300° C.

When the "smart window" device 10 is operated in its colored state, as depicted in FIG. 1A, the switch 17 to battery 16 is closed for a sufficient time to cause the lithium ions to transport from the ion conductive-electron resistive layer 14 to the electrochromic layer 15 to bring the electrochromic layer to its metallic or colored state. The switch 17 is then opened and the electrochromic layer remains in its colored state until such time as the polarity is reversed and the lithium ions are removed from the electrochromic layer 15 to thereby oxidize the electrochromic layer to its bleached state. When the polarity of battery 16 is reversed, to that depicted in FIG. 1A, and switch 17 is closed, the charge stored within the electrochromic layer 15 returns to the battery by means of conductors 21 to restore the battery to its original charge, since very little energy is lost in ion transition to the electrochromic layer 15. Should a rectified voltage source, other than battery 16, be employed to charge the "smart window" device, the "smart window" itself then behaves like a storage battery and, depending upon the thickness of the electrochromic layer 15 and the total surface area of the "smart window" device, could store a considerable amount of electrical energy.

The explanation for the transport of lithium ions is believed due to the glassy structure of the $LiO_2: Nb_2O_5$ mixtures. The lithium ion is capable of compensating the unsaturated oxygen bond and thereby becomes the mobile ion. The random nature of the glassy mixture readily provides an excess of available sites for the mobile lithium ions. A good description of the ion transport mechanism is found in a paper by H.L. Tuller and D.P. Button entitled "The Role of Structure in Fast Ion Conducting Glasses", presented in 1985 at the Proceedings of the Sixth International Symposium on Metallurgy and Material Science. This paper is incorpoated herein for purposes of references and should be reviewed for a good description of the mechanism of the lithium ion transport.

To separately determine the electrical properties of an ion conducting layer of both $Li_2O:Nb_2O_5$ and $Li_2O:Ta_2O_5$, their mixing oxides were prepared by RF sputtering in a vacuum chamber under a controlled atmosphere including argon and oxygen having a total pressure of 5 to 15 militorr onto a glass substrate which is coated with $WO_3$ and tin-doped $In_2O_3$. To compensate for the loss of X moles of lithium during the deposition process, $$\frac{(1 + X)}{2} Li_2O: Nb_2O_5 \text{ and } \frac{(1 + X)}{2} Li_2O: Ta_2O_5$$

were prepared.

Another method for compensating for the loss of lithium ions during deposition is to insert X moles of lithium into the coated glass substrate prior to deposition of the mixed oxides. The compensation process for evolving stoichiometric mixed oxides of $Li_2O: Nb_2O_5$ and $Li_2O:Ta_2O_5$ is an important part of this invention since resultant mixed oxide layers in stoichiometric composition were heretofore unattainable. The resulting thickness of the mixed oxide layers ranged from 140 to 800 Nanometers, the electronic resistivity measured in excess of $10^{10}$ Ohm-centimeters and the lithium ionic conductivity was in excess of $10^{-7}$ Ohms-centimeters$^{-1}$. Other materials which are believed to form mixed oxides with $Li_2O$ are $B_2O_3$, $MgO$, $Al_2O_3$, $SiO_2$, $CaO$, $MnO$, $ZnO$, $Ga_2O_3$, $WO_3$, $MoO_3$, $GeO_2$, $SrO$, $Y_2O_3$, $BaO$ and $ZrO_2$. The metal oxides which form mixed oxides with lithium are hereafter defined as "lithiated oxides".

Other transparent substrates, such as a flexible Mylar or Kapton, DuPont's tradename for polyimide plastic, could also be used in place of the glass. This flexible substrate containing the "smart window" layered structure would then allow plate glass windows in existing buildings to be converted to "smart windows" by adhering the flexible "smart window" layered plastic material either to the interior or the exterior surface of the plate glass, in situ.

Figure 3:
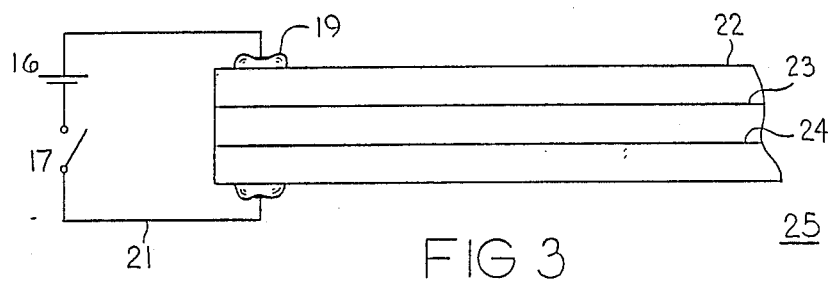
FIG. 3 is a side view of a three layer thin film storage battery according to the invention and FIG. 4 is a side view of the four-layer thin film storage battery according to the invention.

A simplified three-layered battery device 25 is depicted in FIG. 3, wherein an electron conductive-ion conductive substrate 24 is coated with an ion conductive-electron resistive layer 23. An electron conductive-ion conductive layer 22 is then applied over the ion conductive-electron resistive layer 23. Electrical connection with layers 22, 24 is made by means of indium solder 19 and wire conductors 21. As described earlier, an external battery 16 and switch 17 provide the requisite voltage across the battery device whereby the polarity of the external battery determines the direction of ion transport into and out of the ion conductive-electron insulative layer 23. With the external battery replaced by a voltage generator, and with switch 17 in its closed position, charge is readily stored in the electron conductive-ion conductive layers 22, 24. The electron conductive-ion conductive layers comprise any of the lithiated oxides of manganese, chromium, iron, cobalt and nickel, whereas the ion conductive-electron resistive layer comprises mixed metal oxides of lithium oxide and tantalum, niobium or zirconium, similar to the ion conductive-electron resistive layers described earlier.

Figure 4:
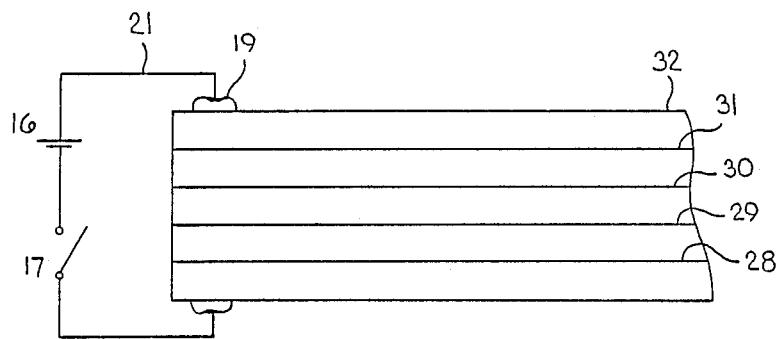

A four-layered battery device 27 is shown in FIG. 4, which is similar to the "smart window" device 10 of FIGS. 1A, 1B with the electrochromic layer 15 eliminated and with the substrate 28 made of an electronically conductive material, such as aluminum. A first storage electrode 29 of ion conductive-electron conductive material such as the lithiated oxides of manganese, chromium, iron, cobalt and nickel is deposited over the electronically conductive substrate. An ion conductive-electron resistive layer 30 is deposited over the first storage electrode and is made from the mixed-oxides described earlier for layer 14 of FIGS. 1A, 1B. A second storage electrode 31 of similar materials as the first storage electrode 29 is next deposited over the ion conductive-electron resistive layer 30. An electronically conductive layer 32 of the tin-doped indium oxide is deposited over the second electrode layer and an external battery 16 is connected with the electronically conductive layer 32 by means of switch 17, conductors 21 and indium solder 19. When the switch is closed, energy is stored in the first and second storage electrodes in the manner described for the three-layered device wherein the electronically conductive substrate 28 and the first storage electrode 29 provide the functions of layer 24 and wherein the electronically conductive layer 32 and the second storage electrode 31 provide the functions of layer 22.

It has thus been shown that electrochromic reflective devices, which are environmentally stable, can be provided by incorporating mixed oxides which include lithium oxide as one of the constituents. The stoichiometry of the resultant mixed oxide layers are insured by either excess lithium in the initial lithium oxide or by pre-depositing excess lithium onto the substrate. The stable electrochromic devices are useful for controlled optically reflective devices as well as storage batteries.

Having described out invention, what we claim as new and desire to secure by Letters Patent is:

1. An electronic device comprising:
a transparent substrate;
a first transparent electronically conductive layer on said substrate;
an electrochromic layer on said first transparent electrically conductive layer;
an ion conductive-electron resistive layer on said electrochromic layer, said ion conductive-electron resistive layer capable of transporting positive metal ions into said electrochromic layer to transform said electrochromic layer into said optically reflective state;
a counter-electrode layer on said ion conductive-electron resistive layer, said counter-electrode layer capable of storing and delivering electrons and ions to be transported into said electrochromic layer to transform said electrochromic layer into said optically reflective state; and
a second transparent electronically conductive layer on said counter-electrode layer, said first and second electrically conductive layers being adapted for connection with an external voltage source, whereby when voltage of a first polarity is applied across said first and second conductive layers said positive metal ions and said electrons are driven into said electrochromatic layer and when voltage of a second opposite polarity is applied across said first and second electrically conductive layers said positive metal ions and said electrons are removed from said electrochromic layer, said ion conductive-electron resistive layer comprising mixed metal oxides said mixed metal oxides layer including lithium oxide and at least one additional oxide selected from the group consisting of, tantalum oxide, and niobium oxide.

2. An electrochromic device comprising:
a transparent substrate;
a first transparent electronically conductive layer on said substrate;
an electrochromic layer on said first transparent electrically conductive layer;
an ion conductive-electron resistive layer on said electrochromic layer, said ion conductive-electron resistive layer capable of transporting positive metal ions into said electrochromic layer to transform said electrochromic layer into said optically reflective state;
a counter-electrode layer on said ion conductive-electron resistive layer, said counter-electrode layer capable of storing and delivering electrons and ions to be transported into said electrochromic layer to transform said electrochromic layer into said optically reflective state; and
a second transparent electronically conductive layer on said counter-electrode layer, said first and second electrically conductive layers being adapted for connection with an external voltage source, whereby when voltage of a first polarity is applied across said first and second conductive layers said positive metal ions and said electrons are driven into said electrochromic layer and when voltage of a second opposite polarity is applied across said first and second electrically conductive layers said positive metal ions and said electrons are removed from said electrochromic layer, said ion conductive-electron resistive layer comprising mixed metal oxides said mixed metal oxides layer including lithium oxide and at least one additional oxide selected from the group consisting of, boron oxide, magnesium oxide, calcium oxide, manganese oxide and zinc oxide.

3. An electrochromic device comprising:
a transparent substrate;
a first transparent electronically conductive layer on said substrate;
an electrochromic layer on said first transparent electrically conductive layer;
an ion conductive-electron resistive layer on said electrochromic layer, said ion conductive-electron resistive layer capable of transporting positive metal ions into said electrochromic layer to transform said electrochromic layer into said optically reflective state;
a counter-electrode layer on said ion conductive-electron resistive layer, said counter-electrode layer capable of storing and delivering electrons and ions to be transported into said electrochromic layer to transform said electrochromic layer into said optically reflective state; and a second transparent electronically conductive layer on said counter-electrode layer, said first and second electrically conductive layers being adapted for connection with an external voltage source, whereby when voltage of a first polarity is applied across said first and second conductive layers said positive metal ions and said electrons are driven into said electrochromic layer and when voltage of a second opposite polarity is applied across said first and second electrically conductive layers said positive metal ions and said electrons are removed from said electrochromic layer, said ion conductive-electron resistive layer comprising mixed metal oxides said mixed metal oxides layer including lithium oxide and at least one additional oxide selected from the group consisting of, gallium oxide, tungsten oxide, molydbenum oxide, germanium oxide, strontium oxide, yttrium oxide and barium oxide.

4. The electrochromic device of claim 1 wherein said first and second electrically conductive layers comprise indium oxide.

5. The electrochromic device of claim 1 wherein said counter-electrode layer is formed from a compound selected from the group consisting of tantalum oxide, niobium oxide, indium oxide and vanadium oxide.

6. The electrochromic device of claim 1 wherein said counter-electrode layer is selected from the group consisting of lithiated oxides of manganese, chromium, iron, cobalt and nickel, said counter-electrode being colored by removal of lithium and becoming bleached by addition of said lithium.

7. The electrochromic device of claim 1 wherein said transparent substrate comprises plastic or glass.

8. A method of forming durable thin film electrical coatings comprising the steps of:

providing a transparent substrate within a deposition chamber;

depositing a layer of a transparent conductive coating on said transparent substrate;

depositing a layer of electrochromic material on said first conductive layer;

depositing a layer of ion conductive-electron resistive mixed-oxides on said electrochromic layer;

depositing a counter-electrode layer of electron conductive ion resistive material on said ion conductive-electron resistive layer;

depositing a layer of a transparent conductive coating on said electron conductive ion resistive layer said step of depositing a mixed-oxides layer comprising depositing a composition which includes lithium oxide in excess of stoichiometry.

9. The method of claim 8 wherein said mixed oxides are deposited by RF sputtering.

10. The method of claim 8 wherein said mixed-oxides layer includes stoichiometric lithium oxide.

11. The method of claim 8 including the steps of:

depositing a quantity of lithium from lithium metal or lithium carbonate on said electrochromic layer to lithium-enrich said electrochromic layer; and depositing said stoichiometric composition on said lithium enriched electrochromic layer.

12. A method of forming durable thin film electrical coatings comprising the steps of:

providing a transparent substrate within a deposition chamber;

depositing a layer of a transparent conductive coating on said transparent substrate;

depositing a layer of electrochromic material on said first conductive layer;

preparing mixed-oxides of lithium oxide and tantalum oxide in excess of stoichiometry depositing said mixed-oxides simultaneously on said electrochromic layer to form an ion conductive-electron resistive layer;

depositing a counter-electrode layer of electron conductive ion resistive material on said ion conductive-electron resistive layer; and depositing a layer of a transparent conductive coating on said electron conductive ion resistive layer.

13. A method of forming durable thin film electrical coatings comprising the steps of:

providing a transparent substrate within a deposition chamber;

depositing a layer of a transparent conductive coating on said transparent substrate;

depositing a layer of electrochromic material on said first conductive layer;

preparing mixed-oxides of lithium oxide and niobium oxide in excess of stoichiometry;

depositing said mixed-oxides simultaneously on said electrochromic layer;

depositing a counter-electrode layer of electron conductive ion resistive material on said ion conductive-electron resistive layer; and depositing a layer of a transparent conductive coating on said electron conductive ion resistive layer.

* * * * *